United States Patent [19]

Schaming

[11] 4,031,741
[45] June 28, 1977

[54] FLATNESS MONITORING SYSTEM FOR STRIP MATERIAL

[76] Inventor: Edward Schaming, P.O. Box 1070, Butler, Pa. 16001

[22] Filed: July 14, 1976

[21] Appl. No.: 705,175

[52] U.S. Cl. ............................................. 73/37.7
[51] Int. Cl.² ...................................... G01B 13/22
[58] Field of Search .................. 73/37.7, 37.6, 105

[56] References Cited
UNITED STATES PATENTS

| | | | |
|---|---|---|---|
| 3,496,744 | 2/1970 | Mizuno et al. | 73/37.7 X |
| 3,850,024 | 11/1974 | Ando et al. | 73/37.7 |

FOREIGN PATENTS OR APPLICATIONS

| | | | |
|---|---|---|---|
| 1,200,213 | 7/1970 | United Kingdom | 73/37.6 |
| 1,160,112 | 7/1969 | United Kingdom | 73/37.7 |

*Primary Examiner*—Richard C. Queisser
*Assistant Examiner*—Joseph W. Roskos

[57] ABSTRACT

Metal strip stock in a rolling mill, paper or the like is constantly monitored for flatness across its width during processing. Monitoring probes carried by a common header or manifold emit air streams which impinge on the moving strip to produce a back pressure on which the nozzle-like probes float and seek to maintain an accurately predetermined fixed air gap between the tips of the probes and the strip or web. Flatness irregularities, whether depressions or humps, in the strip are reflected by movements of a probe or probes, an such probe movement causes a change in the outputs of associated linear voltage transistors which are linked through a signal modulator means to a visual display of strip flatness irregularities. The system is sensitive and accurate as well as automatic once installed and set into operation. Physical contact between parts of the system and the product is avoided.

7 Claims, 3 Drawing Figures

FLATNESS MONITORING SYSTEM FOR STRIP MATERIAL

BACKGROUND OF THE INVENTION

A distinct need exists in the metal rolling industry, paper making industry, and in other web manufacturing fields for a simple, economical and efficient means to constantly monitor the shape of the product as it is being formed and without the necessity for stopping the mill or other web processing machinery for flatness inspection of the product, as has been customary in the prior art.

Traditionally, a variety of rather haphazard and inefficient procedures have been utilized in metal rolling mills and similar web forming machines to periodically check on the relative flatness of the product. One such procedure is to stop the mill and remove a section of metal from the web and lay it on a flat surface to observe the degree of flatness of the web. Such a procedure is not only crude but costly in time, material and labor, and gives only a random sampling of the flatness characteristics of the web at irregular intervals along it.

Ideally, a flatness monitoring system should continuously check the flatness of the moving web or strip while the same is moving across its entire width and without parts of the monitoring system coming into physical contact with the web to scratch, tear or otherwise damage it. Furthermore, the monitoring means should be capable of providing an immediate and direct indication of the shape of the product, its flatness, or lack of flatness, so that proper corrective steps can be taken in the manufacturing process, such as changing roll tension, increasing or decreasing web coolant, in the case of metal stock, and other like steps.

With the above need in mind, the present invention seeks to satisfy the ideal by providing a flatness monitoring means or "meter" for a metal web in a rolling mill or a similar product which provides a direct visual display of the flatness condition of the product continuously without the need for stopping the processing machinery or establishing any physical contact with the product. The monitoring procedure can be carried out on either side of the web and only one side needs to be monitored or scanned by the monitoring or sensing probes of the apparatus. The composition of the strip or web has no effect on the proper operation of the flatness monitoring means. The apparatus employed for the invention is of simple design utilizing some commercially available components and parts which are plugged into a common header or manifold for easy replacement and repair. The apparatus is also reasonably rugged and durable and does not require great skill to install, adjust and maintain Other features and advantages of the invention will become apparent during the course of the following detailed description.

BRIEF DESCRIPTION OF THE DRAWING FIGURES

DETAILED DESCRIPTION

Figure 1:
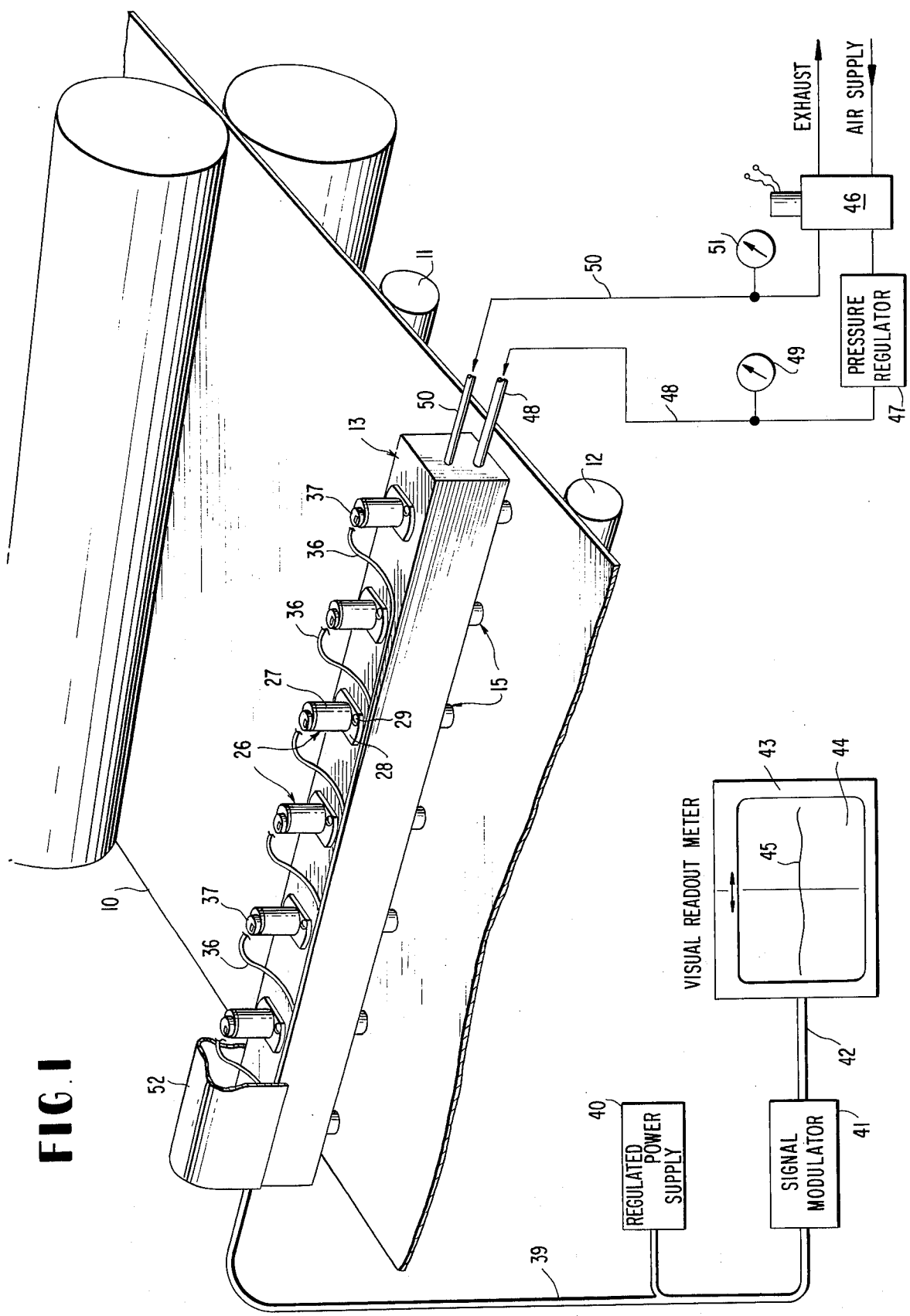
FIG. 1 is a perspective view of the invention, partly schematic, installed for monitoring the flatness of metal strip stock in a rolling mill.
Figure 2:
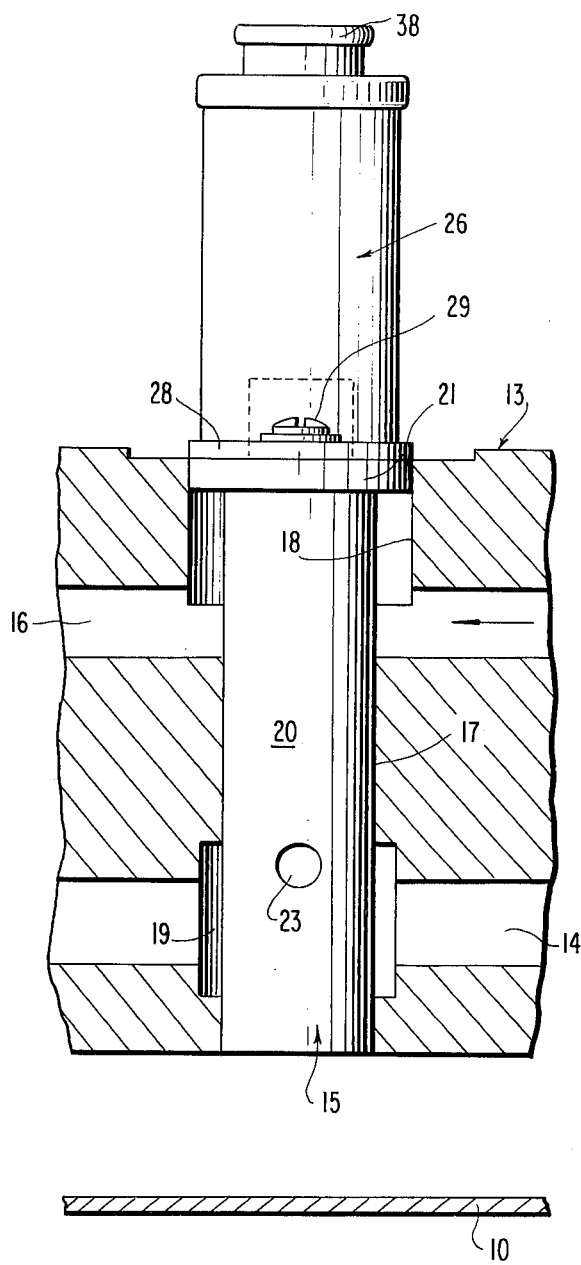
FIG. 2 is an enlarged fragmentary vertical section through a pneumatic header or manifold and showing a retracted pneumatic sensing probe and associated electrical signal transmitter.

Referring to the drawings in detail wherein like numerals designate like parts, a metal strip 10 or web is illustrated during processing in a rolling mill which includes a pair of spaced web support rolls 11 and 12. Preferably midway between the lines of contact of the support rolls with the web 10, a pneumatic header or manifold 13 is fixedly positioned to span one side of the web 10 transversely in spaced relation thereto and parallel to the plane of the web. The manifold 13 is supported by any conventional means, not shown.

The manifold 13 contains a main pneumatic supply longitudinal passage 14 for supplying air under controlled pressure to pneumatic sensing probes 15, to be described, and a secondary longitudinal pneumatic probe retract passage 16 parallel to the main passage 14 and spaced therefrom, as indicated.

At equidistantly spaced points on the header or manifold 13, FIG. 1, transverse bores 17 for the sensing probes 15 are formed through the manifold from top to bottom thereof and these bores intersect the two longitudinal passages 14 and 16. The bores 17 are enlarged in diameter at their tops as indicated at 18 and are similarly enlarged at and immediately above and below the pneumatic supply passage 14 as indicated at 19, for purposes to be described. The bores 17 are formed at right angles to the parallel passages 14 and 16.

The flatness monitoring or sensing probes 15 are nozzle-like cylindrical bodies 20 which engage closely and slidably within the bores 17 and are equipped near their tops with annular retract shoulders 21 integral therewith, such shoulders engaging slidably in the enlarged bore portions 18 of the manifold. Each probe 15 in its body portion has an internal chamber 22 whose length is not critical and preferably four equidistantly spaced radial pneumatic supply ports 23 formed in the side wall of the probe lead into the chamber 22 and are in communication with the main pneumatic supply passage 14 at all times. A central pneumatic outlet port 24 in each probe 15 immediately below the ports 23 communicates with an outlet chamber or passage 25 which opens through the forward tip of the probe which is the lower tip in the illustrated arrangement.

Directly above each sensing probe 15 in axial alignment with one bore 17 is a linear voltage transmitter 26 or signal emitter of a conventional type including an outer cylindrical shell 27 having a bottom flange 28 secured by screws 29 to the top face of header 13 which is preferably rectangular in cross section as illustrated. Each transmitter 26 has an integral internal axial sleeve 30 of insulating material, having embedded therein a pair of stationary conductor rings 31 in axially spaced relation. A probe followerelement or stem 32, also of insulating material, carries an external conducting sleeve 33 fixed thereon and spaced by an insulating gap from the elements 31. The sleeve 33 moves with the stem 32 axially relative to the fixed rings 31. The stem 32 is coupled with the probe 15 by an adjustable threaded coupling element 34. Movement of the stem in one direction, upwardly in the illustration, is opposed by a compression spring 35 in the top of the transmitter device 26.

The electrical signal outputs of the linear transmitters 26 are transmitted through cable leads 36 having quick disconnect couplings at 37 with mating coupling elements 38 on the transmitters 26. Individual conductors, not shown, of the cable leads 36 are electrically connected with the rings 31 internally of the sleeve 30. The several leads 36 are joined with and form parts of a multiconductor cable 39 receiving power from a conventional regulated AC power source 40, FIG. 1. A conventional signal modulator means 41 coupled with the cable 39 feeds a corrected signal through a cable 42 to a visual display unit or readout means 43 having a viewing screen 44. The unit 43 is entirely conventional as are all of the described electrical components of the system. When the system is operational, the viewing screen 44 continuously depicts as at 45 a shape representation of the moving web 10 being monitored for flatness. Any depressions or humps in the web will be visually displayed so that proper corrective steps may be taken in the mill or web processing machinery to improve the flatness of the product.

A suitable compressed air source, not shown, delivers compressed air through a four-way two-position solenoid valve 46 which is a combined air supply and exhaust valve. The solenoid of the valve is adapted to be connected with a remote control station, not shown. Air supplied through the valve 46 passes through a pressure regulator 47, set typically at 10 psig, and from this regulator the compressed air flows through a supply line 48 having a pressure gage 49 therein. The supply line 48 is coupled into the main pneumatic supply passage 14 of the manifold 13. Similarly at required times air can be delivered through the valve 46 to a separate supply line 50 equipped with a pressure gage 51. The supply line 50 is coupled into the described probe retract passage 16 of the manifold 13. Retract air is also exhausted through the valve 46 at proper times as indicated by the exhaust arrow in FIG. 1.

A guard or cover 52 for the several signal transmitters 26 is provided removably on the header or manifold 13 to protect the transmitters. A feature of the invention is that the transmitters 26 and sensing probes 15 are plugged into the manifold removably to facilitate servicing and replacement individually as when damage occurs. This avoids the necessity for replacing the entire manifold assembly which would be more costly. The entire construction of the manifold assembly which forms the heart of the invention is economical, simplified and compact.

Figure 3:
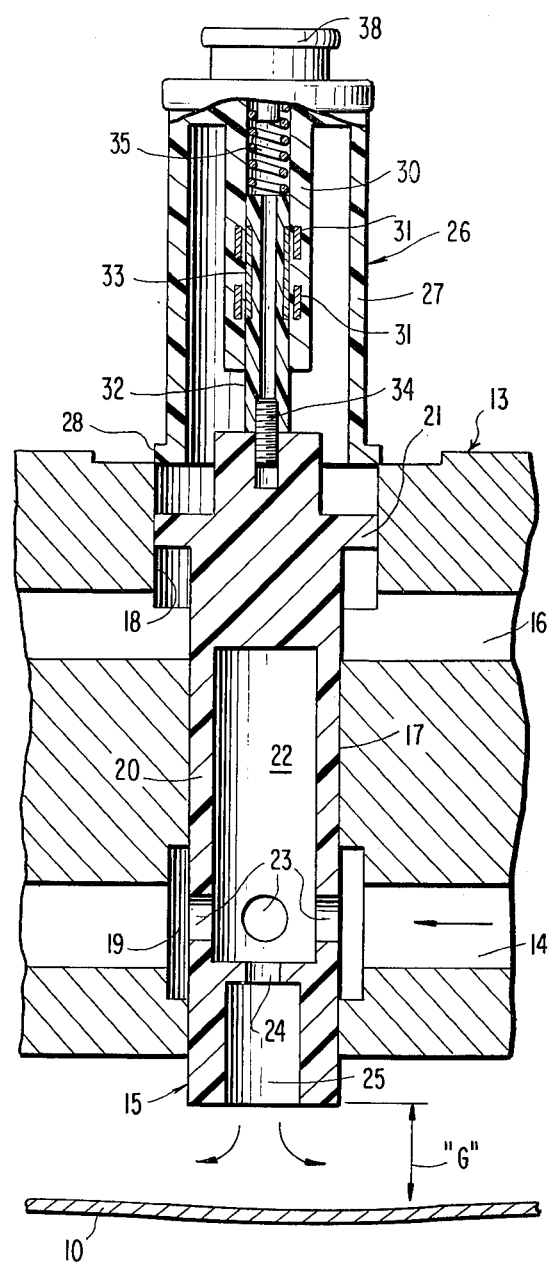
FIG. 3 is a similar cross sectional view with the probe extended from the manifold and with both the probe and signal transmitter in cross section.

Preferably, the linear signal transmitters 26 are of a well known commercial type manufactured and sold by Robert Bosch Corporation, 2800 South 25th Ave., Broadview, Ill. 60153. They are inductive sensors which can be used to sense linear position or as electrical signal transmitters, as in the present application. Simple linear movements of the sleeves 33 with the floating probes 15 cause the signal voltages to vary due to changes of inductivity in the units 26. As the several floating probes 15 across the manifold 13 constantly seek to maintain a fixed distance or gap G, FIG. 3, relative to the strip 10, there will be constant signal voltage changes representative of flatness irregularities in the product and the results are continuously visually displayed on the unit 43, as previously noted.

It is believed that the various features and advantages of the invention will now be apparent to those skilled in the art, without the necessity for a further description herein.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. An apparatus for monitoring flatness in a moving strip product comprising a manifold spanning substantially the width of the moving product and mounted in spaced relation to one face thereof, plural spaced pneumatic sensing probes on the manifold having pneumatic discharge passages for directing pneumatic streams against the opposing face of the product without physical contact between the probes and product, the probes floating on the back pressures of said pneumatic streams and maintaining uniform gaps between their tips and said opposing face of the product, coacting electrical signal transmitters connected with the probes and responding to movements thereof and producing signals representative of flatness irregularities in the product, and visual electrical display means connected with said signal transmitters to constantly display a representation of product flatness or lack of flatness, said manifold having a main pneumatic passage in intersecting relationship to said probes, the probes having pneumatic inlet means in communication with said main pneumatic passage and also in communication with said discharge passage of each probe, said manifold additionally having a separate secondary pneumatic passage in intersecting relation to said probes, and a piston means on each probe communicating with said secondary pneumatic passageway whereby pneumatic pressure therein at selected times can cause retraction of the probes into the body of the manifold.

2. An apparatus for monitoring flatness as defined in claim 1, and a spring means connected with each probe resisting pneumatic retraction thereof.

3. An apparatus for monitoring flatness as defined in claim 2, and each signal transmitter consisting of a linear inductive transmitter having a movable plunger connected with one of said probes and further having a relatively stationary component secured to the manifold, and said spring means disposed between said plunger and said relatively stationary component.

4. An apparatus for monitoring flatness as defined in claim 3, and wherein the manifold has a transverse through bore receiving each sensing probe for linear movement therein, and each linear inductive transmitter having a shell secured fixedly to an exterior face of the manifold and having an internal fixed sleeve element with spaced annular induction elements therein surrounding said movable plunger, the movable plunger carrying a movable induction element for coaction with said annular induction elements in the production of variable signal voltages.

5. An apparatus for monitoring flatness as defined in claim 3, and an adjustable connection between each sensing probe and the plunger connected therewith.

6. An apparatus for monitoring flatness as defined in claim 5, and said connection being in the form of a screw-threaded stud.

7. An apparatus for monitoring flatness in a moving strip product comprising a manifold spanning substantially the width of the moving strip product and mounted in spaced relation to one face thereof, plural spaced pneumatic sensing probes on the manifold having axial pneumatic discharge passages for directing pneumatic streams against the opposing face of the product without physical contact between the probes and said strip product, the probes floating on the back pressures of said pneumatic streams and maintaining uniform gaps between their tips and said opposing face of the product, coacting linear electrical signal transmitters connected with the probes and responding to movements of the probes to produce signals representative of flatness irregularities in the strip product, and visual electrical display means operatively connected with said signal transmitters to produce a constant display of product flatness or lack of flatness, said manifold having a main longitudinal pneumatic passage adapted for connection at one end of the manifold with a regulated supply of pneumatic pressure and said longitudinal passage intersecting said probes within said manifold, and each probe having plural circumferentially spaced radial pneumatic inlet ports in open communication with said main longitudinal pneumatic passage and also being in communication with the discharge passage of each probe.

* * * * *